United States Patent
Stolle

(10) Patent No.: US 6,267,432 B1
(45) Date of Patent: Jul. 31, 2001

(54) HYDRAULIC ACTUATING SYSTEM FOR MOVABLE PARTS

(75) Inventor: Klaus Stolle, Schwabniederhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/190,142

(22) Filed: Nov. 12, 1998

(30) Foreign Application Priority Data

Nov. 12, 1997 (AT) .................................................. 1918/97

(51) Int. Cl.$^7$ ........................................................ B60J 7/12
(52) U.S. Cl. ............................... 296/107.01; 296/107.08; 92/5 R; 91/1
(58) Field of Search .................... 296/107.08; 92/5 R; 91/1

(56) References Cited

U.S. PATENT DOCUMENTS

| | | | |
|---|---|---|---|
| 2,826,165 | * | 3/1958 | Adelson .................................. 91/1 X |
| 3,739,165 | * | 6/1973 | Esken ..................................... 91/1 X |
| 4,936,143 | * | 6/1990 | Schutten et al. .................... 92/5 R X |
| 5,067,768 | * | 11/1991 | Fischbach ....................... 296/107.08 |
| 5,182,979 | * | 2/1993 | Morgan .................................. 92/5 R |

FOREIGN PATENT DOCUMENTS

3303598 * 8/1984 (DE) ...................................... 92/5 R

* cited by examiner

*Primary Examiner*—Dennis H. Pedder
(74) *Attorney, Agent, or Firm*—Dykema Gossett PLLC

(57) ABSTRACT

A hydraulic actuating system for movable parts, particularly for hinged covers on vehicles, includes at least one or more working cylinders with a piston equipped with sealing means pressing against the cylinder wall. A control unit is connected with one or all cylinders, and a pressure sensor connected to a control unit. Devices on the cylinder and piston are designed to cause pressure modulation in the cylinder and a common hydraulic circuit. The outgoing signals from the pressure sensor, are changed corresponding to the pressure modulations and are transmitted to the control unit to be used for position control and/or identification of one or all cylinders by the control unit.

15 Claims, 5 Drawing Sheets

HYDRAULIC ACTUATING SYSTEM FOR MOVABLE PARTS

BACKGROUND OF THE INVENTION

1. Field of the Invention

The invention relates to a hydraulic actuating system for movable parts, particularly for hinged movable covers on vehicles with at least one working cylinder that has a piston with sealing means fitted against a cylinder wall whereby a control unit is connected to one or all cylinders and with a pressure sensor in a common hydraulic circuit. The invention relates further to a vehicle convertible top and a method to adjust its position and/or identify a working cylinder in a hydraulic actuating system whereby the pressure in the hydraulic circuit is monitored by a pressure sensor and where a corresponding signal is received and analyzed by a control unit.

2. The Prior Art

A hydraulic actuating system for a vehicle top is known from patent AT-PS 402 280, whereby a pressure sensor is placed in the common hydraulic circuit of the working cylinder and whereby the pressure sensor is connected to a control unit for separate switching elements of the cylinder. The outgoing signal of the pressure sensor is used to control the end-of-stroke position of each cylinder taking into account the progression of the pressure values and a predetermined switching sequence of the individual switching elements. Without costly separate end-position switches at each cylinder or the corresponding part of a convertible top system, the control system for the entire system can be simplified; but the cylinders may only be controlled in a predetermined switching sequence and changes in the switching sequence would necessitate a new setup for the entire control program. Above all, there is no possibility of recognizing intermediate positions of the working cylinder and to allow, for example, overlapping movements of the cylinders or with external operations.

It is therefore the object of the invention to produce a hydraulic actuating system for general utilization purposes, which avoids the above-mentioned disadvantages with maximum simplicity and which makes possible in regard to production, assembly and maintenance, a cost-effective construction, a flexible programmable control system as well as a time-saving overlapping or parallel operating work cycle of the cylinder in the hydraulic actuating system. Additional objects of the invention are a vehicle convertible top system, which would also have the above mentioned characteristics and would provide a simple, inexpensive and reliable method for controlling positions and/or identification of a working cylinder in a hydraulic actuating system.

SUMMARY OF THE INVENTION

The first object is solved, according to the invention, in that means is provided to cause modulation of pressure in a cylinder. Altered output signals of a pressure sensor corresponding to the pressure modulation is transmitted to the control unit and can be used for position control and/or identification of one working cylinder out of a plurality of working cylinders or for identification of all working cylinders. Said pressure modulation is superimposed on the general operating flow in the system and can be easily identified by the control unit. According to requirements, the position of each piston can be identified through the described method during the course of a piston stroke, including also intermediate positions between the end positions. It is possible without great effort to obtain a feed-back signal for additional position sensors and subsequent action when intermediate positions have been reached by the piston. This also makes production and assembly of the hydraulic actuating system for general utilization more cost-effective, more simple and reliable since no separate position sensors and fewer components, cables and connectors have to be mounted or installed. The control unit can determine the maximum position with less input signals and safety is increased by continuous pressure monitoring. Pressure modulation can, of course, also transmit an individual signal for actuation of each single cylinder.

The above mentioned advantages are increased even more when a plurality of cylinders, which are controlled by separate switching elements, are connected with the control unit and the pressure sensor within the hydraulic circuit. In this case, subsequent operational cycles of separate cylinders can be designed more flexibly and operation of a subsequent cylinder can be started even when the previous cylinder is still in an intermediate position. Even then, the hydraulic actuating system remains cost-effective and very simple in its construction since it has only one pressure sensor and one control unit, which can be designed very simply and economically.

In addition or alternatively to the position control, in a system with a plurality cylinders wherein it is desired to identify at least one working cylinder, a cylinder can be equipped with means for pressure modulation according to a typical pattern of the pressure modulation for identifying said cylinder. An individual recognition is realized through an identifying pattern of each single cylinder or group of simultaneously operating cylinders so that overlapping or parallel control of several cylinders or group of cylinders is made possible in a very simple way. The identification of each cylinder can be accomplished by the amount and/or characteristics of the pressure change, whereby the first variant depends of course on the signals of the installed pressure sensors and whereby general pressure fluctuations can be a nuisance. It is therefore preferred to use an identification of the type of a "bar code", whereby each cylinder or cylinder group is identified by a typical pattern of pressure fluctuation (fluctuation from the normal pressure conditions in relation to the corresponding position of the piston), independent from its absolute value, but with consideration of the prior patterns of pressure fluctuation. The control unit may be programmed more flexibly since the cylinders may be controlled in a different sequence, if so desired, and where the entire program will not have to be rewritten, but only the codes of the cylinder identification have to be changed.

According to additional invention characteristics, the means for pressure modulation have at least one portion that has a different size cross-sectional area in relation to other portions; and this divergent cross-sectional area is on at least two parts that move past one another and come into contact with one another during a piston stroke. This type of design makes it unnecessary to place additional components on the cylinder and thereby reduces expenses in construction, production, assembly and increases operational dependability based on the low number of components that can break down.

In a first embodiment of the invention there is a deviation of the cross-sectional area caused by a circumferential outwardly extending indentation which preferably extends around the entire circumference of the cylinder wall and/or the passageway through which the piston rod extends whereby the pistons have a seal fitted against the cylinder wall or a seal on the piston rod is fitted against the passageway for the piston rod. At the location of the deviation in cross-sectional area, whereby only the absolute value of the cross-sectional area is taken into consideration and not its shape, the elastic seal of the piston or the piston rod is expanded while it still retains its sealing effectiveness and this makes an easier movement of the piston in the cylinder possible. As a result of this increase in cross-sectional area, a decrease in pressure in the circuit will occur, which will cause a corresponding output signal by the pressure sensor when the piston passes the portion of deviation cross-sectional area. The temporary pressure drop results in a pressure modulation that is processed through the control unit, which also identifies passing of the piston through the portion of the cylinder with the increase in cross-sectional area or the action of the cylinder caused by this increase in cross-sectional area.

The outwardly-extending indentation has been described as extending around the entire circumference of a cylinder or passageway, but it may extend along only a portion of the circumference, with at least one more indentation extending along the circumference and being spaced from the aforementioned indentation.

According to a particular embodiment of the invention, the length of indentation in the cylinder wall extending in the stroke direction of the piston is greater than the effective sealing distance of a seal on the piston. This causes the hydraulic fluid to flow into the space behind the piston, which in turn results in a drop in pressure. However, the piston is moved along even with the drop in pressure because of the sufficient flow volume and then the piston moves quickly to a section where it makes a tight seal again and the pressure is restored once more to the operational system pressure. The temporary pressure drop during passing of the part with the deviation in cross-sectional area effects the normal modulation in the operational pressure circuit and is therefore recognized by the control unit.

An alternative in design to the above-described embodiment could be that the deviation of the cross-sectional surface is created by an inward indentation that runs preferably around the entire circumference of the cylinder wall and/or around a passageway through which the piston rod extends and whereby the piston has a seal fitted against the cylinder wall or whereby the piston rod has a seal fitted against the passageway for the piston rod. Through this logical reversal of the above-mentioned mechanical action, a temporary pressure increase occurs during practical application of this generally simple embodiment, which can be observed as a pressure peak in relation to the operational pressure in the hydraulic circuit.

The inwardly-extending indentation may extend along only a portion of the circumference, with at least one more indentation extending along the circumference and being spaced from the aforementioned indentation.

Another embodiment, according to the invention, is designed where the deviation of the cross-sectional surface is created by at least one hole in the cylinder wall and/or the corresponding passageway through which the piston rod passes and whereby either a fixed or adjustable plug is inserted into the hole and the piston has a seal fitted against the cylinder wall and/or a piston rod also has a seal fitted against the passageway through which the piston rod passes. The cross-sectional area of the cylinder is adjustable by the insertion or removal of the plug or, for example, by screwing the plug in or out into different positions. It could also cause a reversal of the code for the pressure change whenever the plug is screwed into the boring of the interior cylinder space so that it at first closes the open recess in the interior cylinder space and finally even extends past the interior wall and thereby creates a surface reduction or conversely an expansion. The noted hole could also be located at an outlet or bypass line, specifically inside the cylinder, which would provide an opening after the piston has passed, to release hydraulic fluid from the cylinder for a short period, which would thereby cause a temporary drop in pressure that is reflected as modulation of the operational pressure in the circuit. This also serves as a position signal for the control unit or an identification signal of the working cylinder.

According to an additional characteristic of the invention it is planned that the devices for pressure modulation are made of at least one element that is separate from the components of the hydraulic system of the cylinders, such as the cylinder itself, piston or possibly the piston rod. Thereby the hydraulic effect of the cylinder is not affected at all or only insignificantly even with its advantageous identification and/or position control capability.

Preferably a separate element for pressure modulation is made of at least one mechanical element which interacts in one portion of the piston stroke in the cylinder with at least one bypassing other element and/or in a specifically shaped area of a passing surface adjacent to the first mechanical element. This mechanical embodiment can be easily constructed and produced based on its simplicity and it is also operationally reliable. To realize a simple and easily built mechanical embodiment with proven common components, the separate element may be a pre-tensioned part that presses against the bypassing element or the bypassing surface and which works together in at least one portion of the piston stroke with at least one deviation of cross-sectional area and/or works together with an upper surface structure affected by the relative movement, whereby the movement of the piston is made easier or harder and whereby pressure modulation is affected.

An advantageous embodiment for simple monitoring of piston position and detection of intermediate positions is characterized in that the cylinder wall and/or possibly a piston rod are equipped with means for producing pressure modulation along their length at equal distances from one another. Thereby the piston position can be determined by simple counters in the control unit and by counting the occurring pressure fluctuation, and this may be taken into account for subsequent switching sequences. A counter in the control unit can be realized in a simple way, should it not already be in existence. Should additionally the individual pressure fluctuation be "coded" by the absolute value, by timely defined fluctuation order or the like, then the end-of-stroke or intermediate positions may be detected in an accurate manner for each cylinder in the system only with one pressure sensor the output signals of which may be further processed in the control unit.

In a preferred embodiment of the invention it is planned that a computer is used in the control unit for monitoring and analyzing pressure, possible identification of cylinders and interpretation of pressure signals to cause actuation of a switching sequence. This can be easily accomplished whereby it is also easy to make changes to adapt to changing events.

Especially advantageous is a further embodiment of the hydraulic actuating system where it is planned that at least one temperature sensor is placed preferably in or at least near the hydraulic circuit whereby the temperature sensor is also connected to the control unit so that the temperature of the hydraulic actuating system can be taken into consideration. Since the time period for the adjustment of individual cylinders between the various end-of-stroke and intermediate positions depends on the hydraulic volume flow and this volume flow depends in turn on the temperature, compensation can be made in a simple manner and the two variables may be used independently from one another so that control of the actuating operation may be safely accomplished.

The second object is solved according to the invention by a vehicle convertible top system that has preferably a multi-sectional frame construction and a cover hatch and at least one working cylinder for relative movement of the frame and also the cover hatch in relation to the vehicle or in relation to one another. This is characterized in that at least one cylinder is part of the hydraulic actuating system described in the above paragraphs. All mentioned advantages are also valid for the utilization of the actuating system to raise and lower a vehicle convertible top whereby the ability to use overlapping working cycles of various cylinders make possible a rapid raising and lowering of the convertible top with a simple, economical and operationally dependable arrangement. Additionally, accurate monitoring during the operation is guaranteed and possible sudden malfunctioning may be diagnosed faster and may be corrected since essential intermediate cylinder positions are included in the system monitoring means.

It is understood that in all cases mentioned above, safety switches, end-of-stroke switches, etc. could be provided to monitor each event additionally or separately.

To solve the objects according to the invention, a method is provided for position control and/or identification of a cylinder in the hydraulic actuating system whereby the pressure in the hydraulic circuit is detected by a pressure sensor from which a corresponding signal is transmitted to the control unit to be analyzed. This is characterized in that the pressure in the hydraulic circuit is modulated in an identifying manner that determines position and/or identifies the corresponding cylinder during passing of the piston of a predetermined part of the piston stroke whereby a signal is produced in relation to the pressure modulation. This signal is transmitted to the control unit of the actuating system to be analyzed.

In another embodiment it is further proposed that the pressure in the hydraulic circuit is modulated by a change in friction of the piston movement during passing of the piston through a predetermined portion of the cylinder.

In an alternate embodiment, the pressure in the hydraulic circuit is modulated during the passing of the piston through a predetermined portion of the cylinder by releasing a portion of the hydraulic fluid, preferably in a short-term connection of the spaces in front and/or behind the piston.

BRIEF DESCRIPTION OF THE DRAWINGS

The invention is described in more detail together with additional characteristics and advantages in the following descriptions and in the attached drawings.

DETAILED DESCRIPTION OF THE PREFERRED EMBODIMENT

Figure 1:
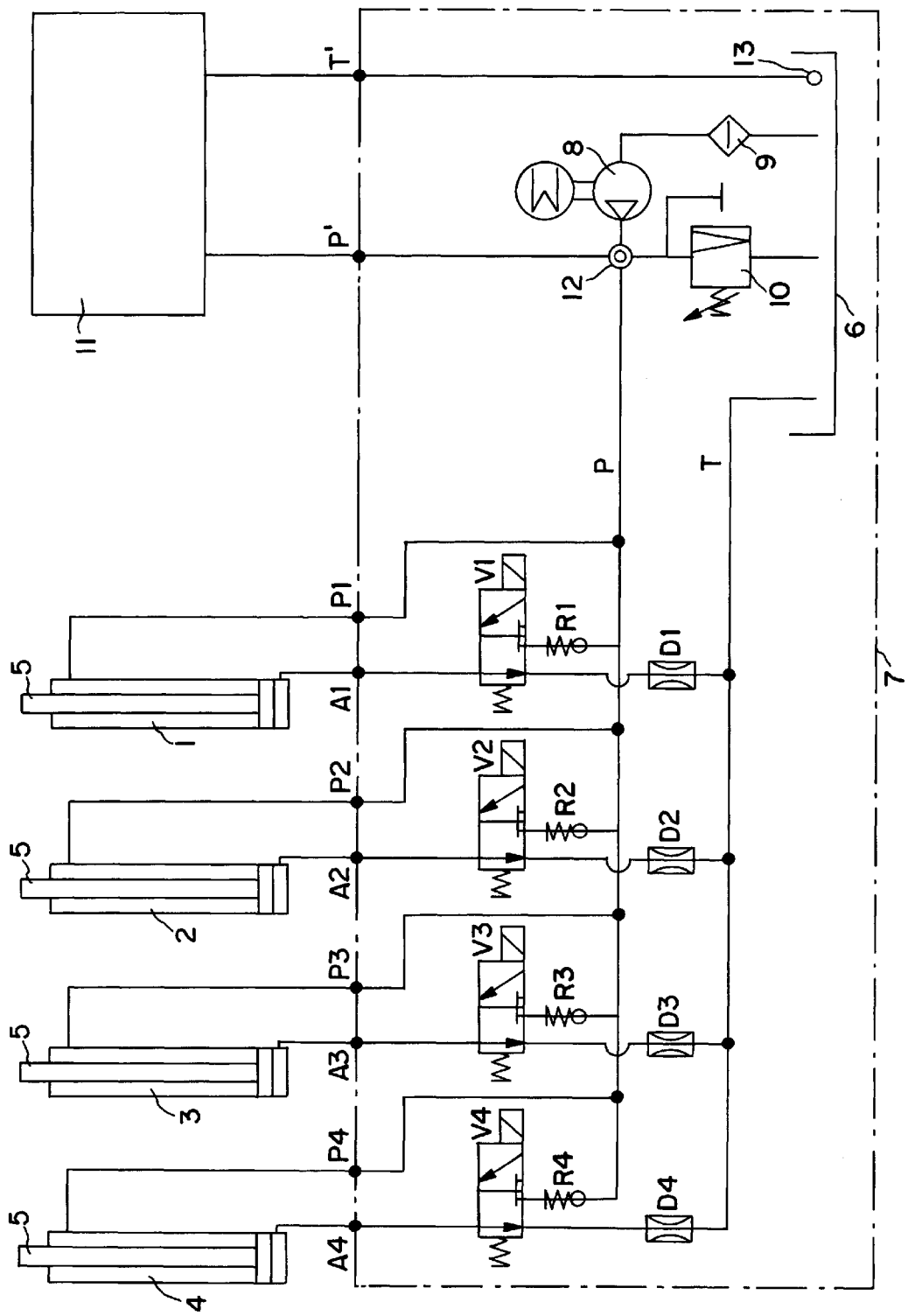
FIG. 1 shows a schematic switching diagram of a hydraulic actuating system with four working cylinders.

FIG. 1 shows cylinders 1 through 4 that may be used, for example, to actuate a vehicle convertible top or other mechanical systems whereby its piston rods 5 are connected with other actuating elements, such as locking devices and levers, not shown. It is understood that additional elements, such as stop switches and safety switches, etc., may be installed. Cylinders 1 through 4 are connected by conduits P1 through P4 in a common hydraulic circuit P. The cylinders are also connected by conduits A1 through A4 by separate chokes D1 through D4 with a line T to the tank 6 that contains hydraulic fluid. Spring-loaded and electric powered check valves R1 through R4 provide a connection between the hydraulic circuit P and the switching elements V1 through V4. Thereby, the switching elements, check valves and chokes as well as the hydraulic pump 8 with filter 9 and the pressure relief valve 10 are preferably placed in a component housing 7 as shown by a dotted line in FIG. 1.

The component housing 7 has outlet lines marked P' and T' (T' is not absolutely necessary) leading to an external control unit 11, output signals from an operating pressure sensor 12 of the hydraulic circuit (outlet P') are transmitted to control unit 11. Preferably a temperature sensor 13 (outlet T1), located here, for example, in the tank 6, also transmits output signals to unit 11 which is connected with the electrically actuated elements of the switching elements V1 through V4. The control unit 11 is preferably equipped with a programmable computer, which monitors and analyzes hydraulic fluid flow and, if need be, temperature (temperature dependent characteristics of the hydraulic actuating system) and which also controls the switching sequence of switching elements V1 through V4.

Figure 2:
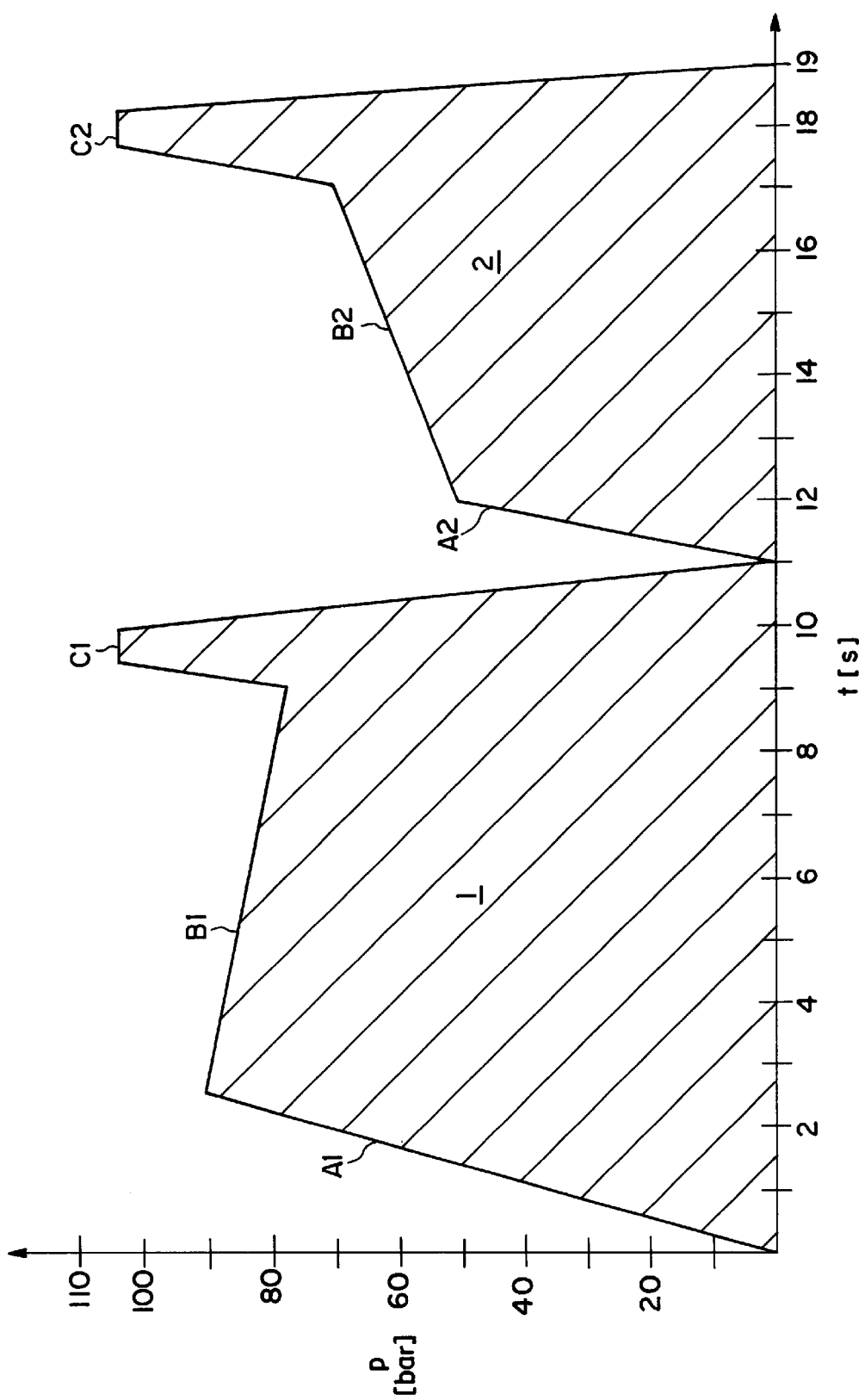
FIG. 2 shows a section of a pressure diagram.

FIG. 2 relates to the hydraulic fluid pressure during the operating cycle of the working cylinders 1 through 4, without consideration of the improvements shown in the presented invention, which can be referred to in order to detect the end-of-stroke or end position in known manner. At first, the piston rods 5 of all cylinders 1 through 4 are pushed all the way in while the switching elements V1–V4 are not under electric power. Then the hydraulic pump 8 in the component housing and the switching element V1 are actuated whereby the piston 5 in cylinder 1 starts to move upward. The pressure sensor 12 transmits a signal representing the hydraulic flow in the cylinder 1 of the hydraulic circuit P to the control unit 11 where its computer diagnoses the values and compares them with a known flow reference variable. As shown in FIG. 2, pressure starts building up in cylinder 1 in the first phase A1 until the piston rod 5 starts to move, the cylinder starts to expand and pressure is applied according to load as shown in phase B1. Whenever the end-of-stroke position has been reached, then the pressure increases to a point where it exceeds the limit C1 set on the pressure release valve 10. A2, B2 and C2 illustrate similar phases for a second subsequent operating cylinder 2. Based on the pressure condition, the control unit 11 can now recognize the end-of-stroke position of the individual cylinders in phases C1 and C2. End-of-stroke position monitoring for subsequent operating cylinders is only possible with a pressure sensor 12.

According to a first embodiment of the invention, certain cylinders or all cylinders 1 through 4 are constructed in such a manner that along the piston 14 and the length of the piston stroke there is at least one section of the cylinder with a reduced cross-sectional surface compared to other sections.

Figure 3:
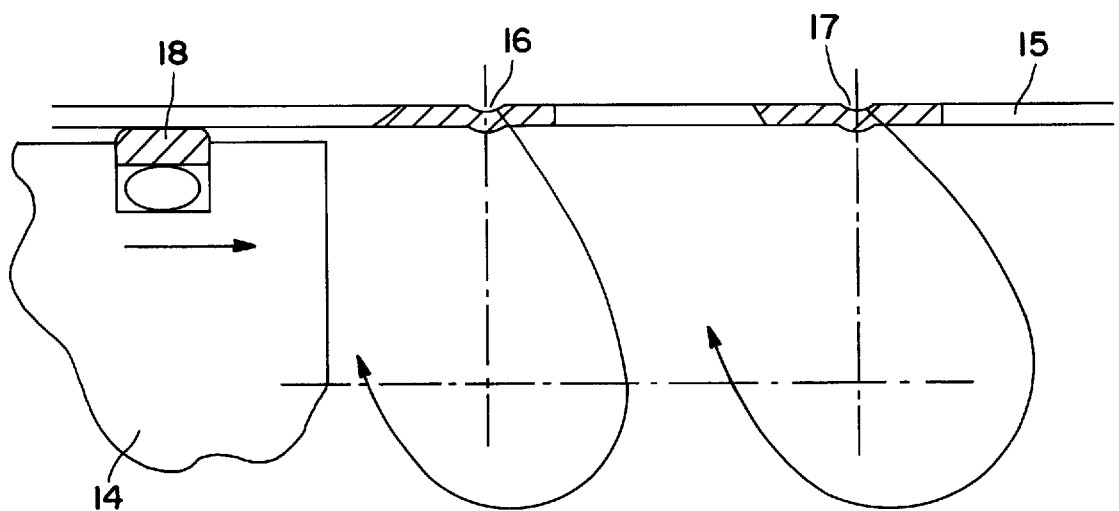
FIG. 3 shows a partial sectional view of a working cylinder of a first embodiment of the invention.

In the first preferred embodiment illustrated in FIG. 3, the cylinder wall 15 of cylinders 1 through 4 have radially inwardly extending indentations (16 and 17), preferably not only on one or more single locations spaced apart along the circumference of the cylinder, but running completely around the entire circumference. Whenever the piston 14 in FIG. 3 moves in the direction of the arrow under the effect of hydraulic fluid, the piston seal 18 is deformed radially inwardly when it reaches the first inward indentation 16 and piston 14 is slowed down to a certain degree at this point, which causes an increase in pressure that subsequently pushes the piston past the indentation in section 16, after which the pressure decreases again to its normal operating level. The seal 18 returns to its original shape and movement of the piston 14 continues again with the normal operating pressure of the cylinder. The movement of the piston past indentation 16 in the cylinder wall 15 causes a brief increase in pressure, a pressure peak, which causes a signal to be transmitted to the control unit 11 by the pressure sensor 12 and also signals the arrival of the piston at a certain position. The same event occurs again in the example in FIG. 3 at indentation 17 which indicates to the control unit 11 that the piston 14 has reached indentation 17 or has passed it. In this way, an identifying pressure modulation in the hydraulic circuit P is produced by the indentations in the cylinder that have a different cross-sectional area opposed to the normal cross-sectional surface and this can be used to transmit corresponding signals from the pressure sensor 12 to control unit 11 which controls the positions of the individual cylinders 1 through 4.

Whenever individual cylinders have a different sequence of portions with reduced cross-sectional surface compared to all other cylinders, similar to a "bar code," then an accurate identification of the individual cylinder is possible and it is possible for the control unit 11 to check if a certain operating cylinder actually has passed a predetermined defined individual position.

Along the length of the piston stroke, all cylinders may have differently spaced portions with a reduced cross-sectional surface which identify intermediate positions essential for the operation of the entire system, whereby each individual cylinder has a clearly identifying sequence of indentations.

Figure 4:
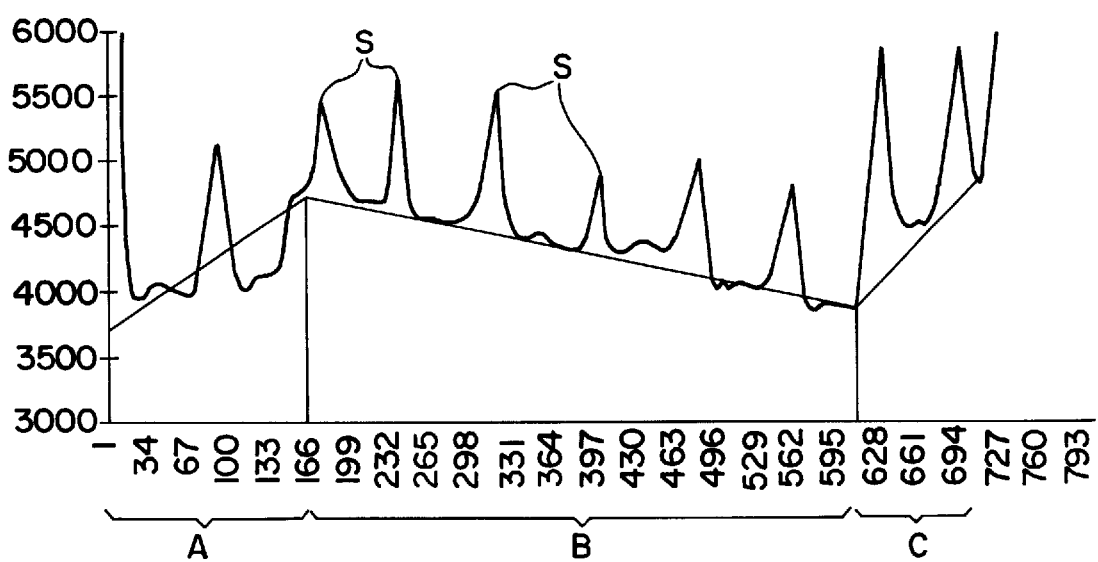
FIG. 4 shows a pressure diagram that reflects the working pressure of a cylinder according to the invention.

FIG. 4 shows part of a pressure diagram for a simple embodiment of a working cylinder according to the invention. The cylinder wall has inward indentations spaced equally apart along the entire length of the piston stroke, which in average slowly form the portions that have an area with reduced cross-sectional surface. In part A, an average increasing system pressure can be seen which changes in part B to an average decreasing pressure in the cylinder. As the piston passes each portion having a reduced cross-sectional area caused by the indentation, a pressure peak S in the hydraulic circuit P can be observed. A computer in the control unit can record this peak in pressure, according to an additional application embodiment, and gives therefore relatively accurate information pertaining to the position of the piston 14. When these pressure peaks S reflect a typical characteristic for each cylinder in the system, for example different relative peak heights etc., then the control unit can recognize actuation of an individual cylinder by these characteristics.

Figure 5:
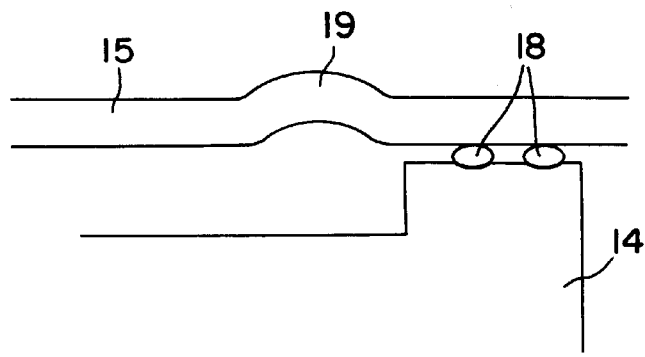
FIGS. 5, 6 and 7 show other embodiments of the cylinder wall.
Figure 6:
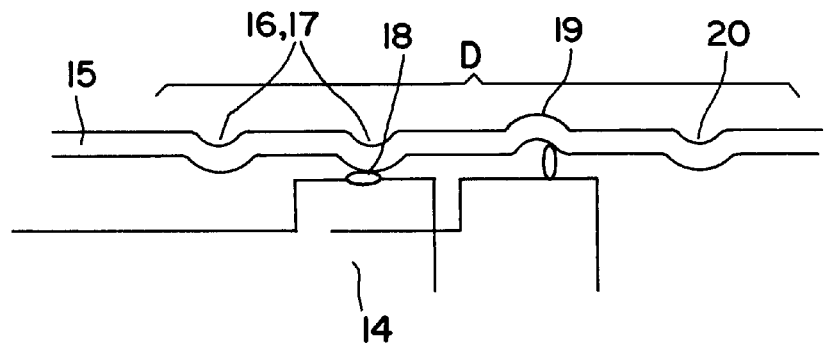
Figure 7:
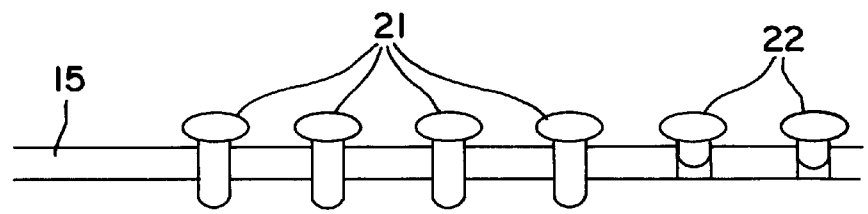

FIGS. 5, 6 and 7 illustrate examples of other possible embodiments of portions with areas of varying cross-sectional surface in the cylinder. An inward indentation in the cylinder wall 15 (as shown in FIG. 3) can also be a radially outward indentation 19 as seen in FIG. 5 such that when the piston 14 passes a portion 19, the piston seal 18 expands and the piston moves more rapidly for a brief time period, which causes thereby a decrease in pressure instead of an increase. This version causes temporary pressure decreases in place of the higher pressure peaks in relation to the operational pressure, which can just as well be used as signals in the control unit 11 for individual piston positions and they can be recorded by the computer and utilized the same way as pressure peaks shown in FIG. 4. An even greater flexibility and many more possibilities for coding of positions or identifying separate cylinders is illustrated in the version of the cylinder wall 15 in FIG. 6, whereby there is proposed a combination of indented portions 16, 17 and 20 of the cylinder wall extending radially inwardly and section 19 with an indentation extending radially outwardly. As the piston passes through part D of the cylinder with its two inwardly-extending indentations 16, 17 and the subsequent outwardly-extending indentation 19 and then again the inwardly-extending indentation 20, a very typical pressure fluctuation pattern is produced within the hydraulic circuit P for part D and/or for the individual cylinder, which in turn signals to the control unit that piston 14 of the moving cylinder has just passed section D or that piston 14 has passed an important intermediate position, and further whereby the piston 14 was specifically identified by this pressure fluctuation pattern.

A change in pressure fluctuation pattern is possible in an embodiment shown for example in FIG. 7. Holes are located in the cylinder wall 15 into which plugs 21, 22 may be inserted at varying distances from one another and may be permanently fixed in place. The plugs 21, 22 may be screwed into a threaded opening in the cylinder wall 15, whereby varying configurations can be used as an additional development of the invention. In FIG. 7, for example, the first four plugs 21 are screwed in far enough to extend into the cylinder interior, which decreases the cross-sectional area, and during passing of the piston 14 pressure points are produced. The two plugs 22 on the right are not screwed fully into the threaded opening and leave thereby a recess in the cylinder wall and create thereby an enlargement of the cross-sectional area that results in a decrease in pressure. This type of construction of a cylinder with an adjustable or changeable cross-sectional surface is especially advantageous for testing purposes or prototypes whereby changes in coding take place more often, or changes in the sequence of cylinder actuation (hereby possible without having to reprogram the control unit 11) or fine adjustments for absolute values or interval in pressure fluctuations occur. The above-described construction is especially practical for cylinders that have pistons without piston rods and have other arrangements for power take off.

The above described devices to cause pressure modulation in the hydraulic circuit of the hydraulic actuating system can of course have a seal 18 alternatively or additionally between the piston rod 5 and the passages in cylinders 1 through 4 through which the piston rods extend instead of having the seal 18 between cylinder wall 15 and piston 14.

All of the above-described embodiments of the invention use exclusively the necessary components needed for the hydraulic operation of a working cylinder to produce pressure modulation to identify a particular cylinder and indicate the position of the piston. However, it is in many cases advantageous to interfere with the hydraulic operation of the working cylinder as little as possible, which means for example, not to expose the seal on the piston or on the piston rod to mechanical friction by deforming or by passing over recesses or indentations. Therefore, embodiments of the invention are advantageous in this case which use at least one separate element to create pressure modulation and which is installed in addition to the actual hydraulic elements like the piston, seals, etc.

This additional element used as a device for pressure modulation is designed to be attached to at least one component which moves past at least one other component during the stroke action of the cylinder. Preferably this would be the working cylinder itself, the piston or a piston rod. This variant of an application is advantageous since it is constructed in a simple manner, can be easily manufactured and is operationally very reliable. There is at least one mechanical element already in existence that interacts in at least one portion of the piston stroke in the cylinder with at least one closely bypassing other mechanical element and/or a typical shaped area in a surface that is adjacent or passes by the first mechanical element. This could be spring-loaded and pre-tensioned movable parts that come into contact with grooves or holes or similar structures of the passing component and work like a ratchet mechanism and thereby affect the movement of the piston in the cylinder. The alternate or additional relatively bypassing and moving components can have a surface structure that improves the piston movement when other components or a pre-tensioned element passes this section—whereby the surface is possibly ground more smoothly—or makes piston movement harder when the surface has been made rough—thereby causing pressure modulation. The advantage of all these embodiments could be designed and constructed where structures affecting pressure modulation are independent from the hydraulically operating structure. An example is a pre-tensioned spring for a mechanical element similar to a friction brake on the piston or piston rod to work together with different rough sections on the interior cylinder wall that is independent from the force with which the piston seal is pressed against the interior cylinder wall. Each component can thereby be put optimally into action without having to make a compromise through simultaneous completion of several tasks.

Figure 8:
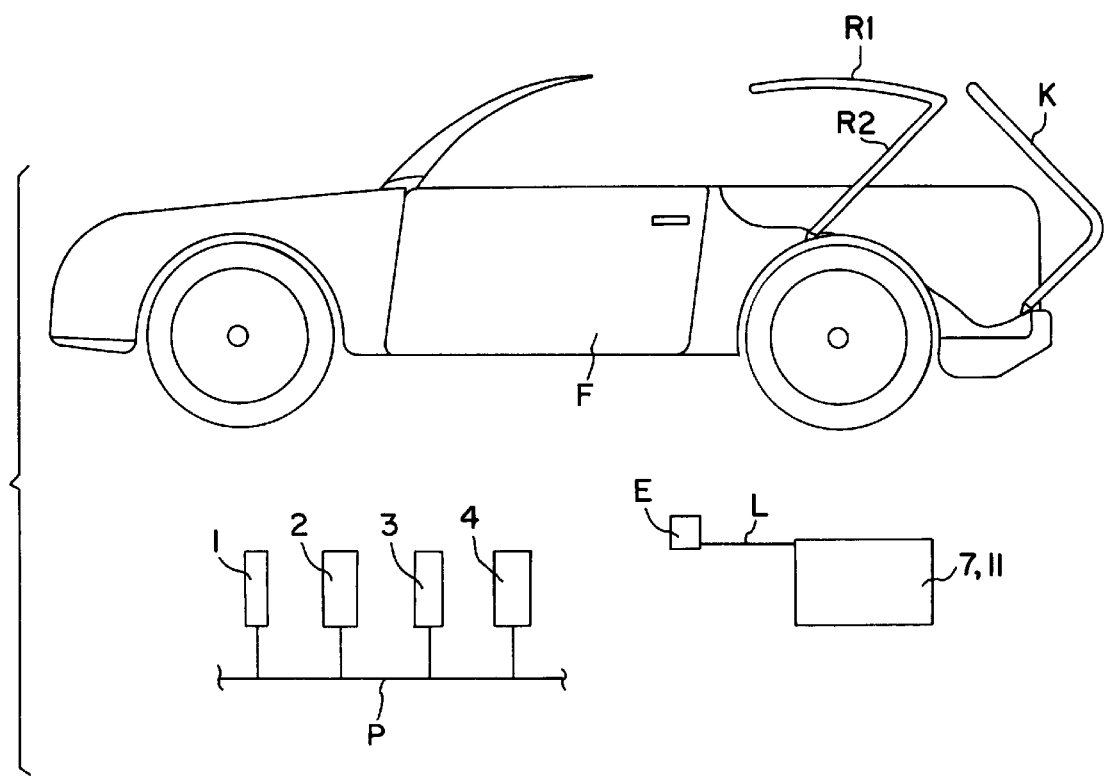
FIG. 8 is a schematic drawing of an automobile with a convertible top that utilizes the hydraulic actuating system of the invention.

FIG. 8 schematically illustrates a vehicle convertible top, which is an example of an embodiment of the hydraulic actuating system according to the invention. The sections of the frame for the convertible top are marked R1 and R2 and they are movable in relation to one another and in relation to the vehicle F itself by the working cylinders 1 and 2. The convertible top R1/R2 is protected and located under a cover hatch K when folded. This cover hatch K is actuated by a third cylinder 3. Furthermore, there is at least one more cylinder 4 for locking the convertible top R1/R2 in the extended final forward position. Cylinders 1 through 4 are connected in a common hydraulic circuit P that is also connected to the hydraulic component housing 7, which is controlled further by an external control unit in the above-described manner. A switch E monitors the arrival of the fully extended convertible top and signals this condition to the control unit 11 through the signal line L.

The hydraulic actuating system, according to the invention, is especially advantageous for the use in a vehicle convertible top with its ability to overlap operational cycles of cylinders, whereby the raising and lowering of the convertible top is considerably quicker, very simple, cost-effective and operationally dependable in this version of the actuating system. One does not have to wait for one cylinder to reach the end-of-stroke position before the second cylinder can be actuated, and without interfering with one another, movement can be overlapping or even parallel. Thereby, both cylinders 1 and 2 can be signaled for actuation to start unfolding the convertible top whereby cylinder 3 is not fully extended but the cover hatch K is already opened to a large degree. Cylinder 3 is in this case operationally in the portion with a cross-sectional deviation that marks a portion of the operating stroke. Conversely, closing of the cover hatch K can be initiated and started even when the convertible top has not been completely locked, but where the frame components R1 and R2 are still moving toward the final extended position and cylinders 1 and 2 are therefore in an intermediate position that is marked by sections with cross-sectional surface deviation—however, there is already enough space to allow pivotal movement of the cover hatch K. Identification of individual cylinders 1 through 4 can be accomplished by reading the typical sequence of portions with cross-sectional area deviation and are used as means to perform pressure modulation. Thus, the proper sequence of cylinder actuation can be monitored and is not discovered by a malfunction in the system during unfolding of the convertible top before the cover hatch is open.

The invention has been described with reference to a preferred embodiment. Obviously, various modifications, alterations, and other embodiments will occur to others upon reading and understanding this specification. It is our intention to include all such modifications, alterations, and alternate embodiments insofar as they come within the scope of the appended claims, or the equivalent thereof.

What is claimed is:

1. A hydraulic actuating system comprising:
a hydraulic circuit;
a plurality of working cylinders with respective switching elements connected to said hydraulic circuit, each of said working cylinders including a cylinder having a cylinder wall and a piston movably positioned within said cylinder, said piston including a peripheral sealing means for contacting said cylinder wall,
a control unit connected to said hydraulic circuit,
a pressure sensor connected to said hydraulic circuit for providing pressure signals to said control unit based on pressure modulation within said hydraulic circuit,
and wherein at least one of said plurality of working cylinders includes means for pressure modulation according to a typical pattern of pressure modulation for identifying said one working cylinder.

2. A hydraulic actuating system comprising:
a hydraulic circuit;
a working cylinder connected to said hydraulic circuit, said working cylinder including a cylinder having a cylinder wall and a piston movably positioned within said cylinder, said piston including a peripheral sealing means for contacting said cylinder wall,
a control unit connected to said hydraulic circuit,
a pressure sensor connected to said hydraulic circuit for providing pressure signals to said control unit based on pressure modulation within said hydraulic circuit,
and wherein cooperating portions of said cylinder wall and said piston periphery have different cross-sectional areas so as to create pressure modulations in said hydraulic circuit as said piston moves within said cylinder to thereby enable control and position identification of said piston by said control unit.

3. A hydraulic actuating system comprising:
a hydraulic circuit;
a working cylinder connected to said hydraulic circuit, said working cylinder including a cylinder having a cylinder wall and a piston movably positioned within said cylinder, said piston including a peripheral sealing means for contacting said cylinder wall,
a control unit connected to said hydraulic circuit, a pressure sensor connected to said hydraulic circuit for providing pressure signals to said control unit based on pressure modulation within said hydraulic circuit, and wherein the cylinder wall includes a plurality of equally spaced devices along a length thereof for pressure modulation.

4. A method for position control or identification of a working cylinder in a hydraulic circuit for movable components, said working cylinder including a piston that is movable therein in strokes, whereby pressure in the hydraulic circuit is measured with a pressure sensor and a corresponding signal is then transmitted to a control unit to be analyzed; wherein the pressure in the hydraulic is modulated during movement of the piston in a predetermined portion along the piston stroke by a change in the friction of piston movement, and a pressure sensor creates a signal corresponding to the pressure modulation and is then transmitted to the control unit of the actuating system to be analyzed, thereby identifying at least one of the position of the piston in the working cylinder and the individual cylinder causing the pulse modulation.

5. A hydraulic actuating system according to claim 2, wherein said cylinder wall includes an inwardly-extending first indentation extending along a portion of the circumference thereof, and wherein said piston includes a seal pressing against said cylinder wall.

6. A hydraulic actuating system according to claim 5, wherein said cylinder wall includes a second indentation extending along a portion of said circumference, said second indentation being spaced from said first indentation.

7. A hydraulic actuating system according to claim 5, wherein said first indentation extends completely around said circumference.

8. A hydraulic actuating system according to claim 5, wherein the first indentation in said cylinder wall has a length in the direction of the piston stroke that is greater than the effective sealing distance of said seal on the piston.

9. A hydraulic actuating system according to claim 2, wherein said cylinder wall includes an outwardly-extending first indentation extending along a portion of the circumference thereof, and wherein said piston includes a seal pressing against said cylinder wall.

10. A hydraulic actuating system according to claim 9, wherein said cylinder wall includes a second indentation extending along a portion of said circumference, said second indentation being spaced from said first indentation.

11. A hydraulic actuating system according to claim 9, wherein said first indentation extends completely around said circumference.

12. A hydraulic actuating system according to claim 2, wherein said cylinder wall includes at least one hole, wherein a plug is inserted in said hole, and wherein said piston includes a seal pressing against the cylinder wall.

13. A hydraulic actuating system according to claim 1, wherein a computer is placed in the control unit for monitoring and analyzing the pressure flow and which computer also controls the switching sequence of the switching elements at a plurality of cylinders.

14. A hydraulic actuating system according to claim 1, including at least one temperature sensor disposed adjacent the hydraulic circuit and connected to said control unit whereby temperature measurements are supplied to said control unit.

15. A combination of hydraulic actuating system a vehicle convertible top system with a multi-sectional frame construction and a cover hatch, and a hydraulic actuating system for operation of said convertible top system, said hydraulic actuating system comprising:

a hydraulic circuit;

a plurality of working cylinders with respective switching elements connected to said hydraulic circuit, each of said working cylinders including a cylinder having a cylinder wall and a piston movably positioned within said cylinder, said piston including a peripheral sealing means for contacting said cylinder wall, a control unit connected to said hydraulic circuit, a pressure sensor connected to said hydraulic circuit for providing pressure signals to said control unit based on pressure modulation within said hydraulic circuit, and wherein at least one of said plurality of working cylinders includes means for pressure modulation according to a typical pattern of pressure modulation for identifying said one working cylinder.

* * * * *